US008031383B2

(12) United States Patent
Szarvas et al.

(10) Patent No.: US 8,031,383 B2
(45) Date of Patent: Oct. 4, 2011

(54) COMMON APERTURE HOLOGRAPHIC STORAGE SYSTEM WITH REDUCED NOISE

(75) Inventors: Gabor Szarvas, Budapest (HU); Zoltan Karpati, Pecs (HU); Krisztian Banko, Ajka (HU); Szabolcs Kautny, Budapest (HU)

(73) Assignee: Thomson Licensing, Boulogne-Billancourt (FR)

( * ) Notice: Subject to any disclaimer, the term of this patent is extended or adjusted under 35 U.S.C. 154(b) by 207 days.

(21) Appl. No.: 12/287,221

(22) Filed: Oct. 7, 2008

(65) Prior Publication Data
US 2009/0103152 A1    Apr. 23, 2009

(30) Foreign Application Priority Data

Oct. 23, 2007 (EP) .................... 07119049
Dec. 5, 2007 (EP) .................... 07122421

(51) Int. Cl.
G03H 1/10 (2006.01)
G03H 1/26 (2006.01)
(52) U.S. Cl. ............... 359/10; 359/22; 369/103
(58) Field of Classification Search ............... 359/10
See application file for complete search history.

(56) References Cited

U.S. PATENT DOCUMENTS
2006/0262701 A1  11/2006  Okada et al.

FOREIGN PATENT DOCUMENTS
WO    WO 2006/003077    1/2006

OTHER PUBLICATIONS
Search report dated May 16, 2008.

*Primary Examiner* — Arnel C Lavarias
*Assistant Examiner* — Jade R Chwasz
(74) *Attorney, Agent, or Firm* — Robert D. Shedd; Harvey D. Fried; James McKenzie

(57) ABSTRACT

An apparatus for reading from or writing to holographic storage media, and more specifically a common aperture type apparatus for reading from or writing to holographic storage media with multiple reference beams having a reduced noise. In a common aperture type apparatus for reading from or writing to a holographic storage medium using shift-multiplexing, with a coaxial arrangement of two or more reference beams and an object beam or a reconstructed object beam, the reference beams being arranged around the object beam or the reconstructed object beam in a storage layer of the holographic storage medium. Each of the reference beams is located essentially halfway between two adjacent central peaks of shift-multiplexed holograms.

9 Claims, 6 Drawing Sheets

COMMON APERTURE HOLOGRAPHIC STORAGE SYSTEM WITH REDUCED NOISE

This application claims the benefit, under 35 U.S.C. §119, of European Patent Application No. 07119049.0 of 23 Oct. 2007 and Patent Application No. 07122421.6 of 5 Dec. 2007.

FIELD OF THE INVENTION

The present invention relates to an apparatus for reading from and/or writing to holographic storage media, and more specifically to a common aperture type apparatus for reading from and/or writing to holographic storage media with multiple reference beams having a reduced noise.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

In WO2006/003077 a 12f reflection type coaxial holographic storage system with three confocally arranged Fourier planes is shown. In this arrangement the object beam and the reference beams are coupled in and out at the first and third Fourier planes, respectively. The reference beams are small spots in these planes. More precisely, they form diffraction patterns, similar to the Airy pattern. This arrangement is a so-called common aperture arrangement, because at the object plane and the image plane the object beam and the reference beams fill out the same area of the aperture. The beams fill out the entire aperture of the objectives. The disclosed arrangement allows to apply shift multiplexing, reference scanning multiplexing, phase coded multiplexing, or a combination of these multiplexing schemes. The reference beams are a pair (or pairs of) half cone shaped beams. The tips of the pair or pairs of half cone shaped reference beams form two lines along a diameter at the Fourier planes of the object beam.

In EP1918914 a holographic storage system using multiple reference beams has been proposed. Two or more spherical reference beams are arranged equally around of the low pass filtered Fourier plane of the spatial light modulator. The reference beams are spots, or more precisely Airy distributions, at the Fourier plane. In the storage material the reference beams act as cones with parallel axes, shifted relative to each other by the diameter of the Fourier filter. In order to avoid phase conjugated read out in reflection type arrangements half-cone reference beams are used instead of full cones.

Holographic storage systems suffer from a plurality of different noise sources. The main sources are the inter-pixel and inter-hologram cross talk, material scattering, detector noise, vibration and other environmental disturbances, servo misalignments, etc. In order to achieve a high data density and high data rates it is necessary to eliminate as many noise sources as possible.

SUMMARY OF THE INVENTION

It is an object of the invention to propose an apparatus for reading from and/or writing to a holographic storage medium with reduced noise.

According to the invention, this object is achieved by a common aperture type apparatus for reading from and/or writing to a holographic storage medium using shift-multiplexing, with a coaxial arrangement of two or more reference beams and an object beam or a reconstructed object beam, the reference beams being arranged around the object beam or the reconstructed object beam in the Fourier plane located in a storage layer of the holographic storage medium, in which each of the reference beams is located essentially halfway between two adjacent central peaks of shift-multiplexed holograms.

It is a further object of the invention to propose a method for reading from and/or writing to a holographic storage medium with reduced noise.

According to the invention, a method for writing to a holographic storage medium using shift-multiplexing with a coaxial arrangement of two or more reference beams and an object beam has the step of arranging the reference beams around the object beam in a storage layer of the holographic storage medium in such way that each of the reference beams is located essentially halfway between two adjacent central peaks of shift-multiplexed holograms in the Fourier plane.

Similarly, a method for reading from a holographic storage medium using shift-multiplexing with a coaxial arrangement of two or more reference beams and a reconstructed object beam has the step of arranging the reference beams around the reconstructed object beam in a storage layer of the holographic storage medium in such way that each of the reference beams is located essentially halfway between two adjacent central peaks of shift-multiplexed holograms in the Fourier plane.

In holographic data storage it is difficult to separate the origin of different noise components in laboratory measurements. To overcome this problem, the noise originating from shift multiplexed holograms has been analyzed with the help of a complex model of the holographic system. For the analysis an ideal optical system and ideal environmental conditions were assumed. It has been found that in the holographic storage systems described in WO2006/003077, as well as in EP1918914, there is a strong relation between the intrinsic noise level and the ratio of the shift distance of the shift multiplexed holograms and the diameter of the Fourier filter. Numerical model calculations have shown that the image quality parameters of the reconstructed multiplexed SLM image are not monotone functions of the shift distance. Jumps of one order of magnitude appear in the Bit Error Rate (BER) and the Symbol Error Rate (SER) function within a micrometer difference of the shift distance. The origin of these huge jumps is a special intrinsic noise, namely the reconstruction of the reference beams of the shifted, non-addressed holograms. With the above proposed optimal arrangement of the multiplexed holograms and the reference beams this noise is reduced by more or less one order of magnitude. The best results are obtained when the reference beams are located essentially at half the shift distance between two adjacent central peaks of shift-multiplexed holograms.

Preferably, the apparatus has four reference beams. In this way it is easily possible to arrange the reference beams around the object beam or the reconstructed object beam in the Fourier plane in such way that they are located between two adjacent central peaks of shift-multiplexed holograms in two perpendicular shift-multiplexing directions. If both shift-multiplexing directions use the same shift-distance, the reference beams are advantageously arranged symmetrically on a circle around the object beam or the reconstructed object beam, which simplifies blocking of the reference beams. However, it is likewise possible to locate the reference beams between different central peaks in the two shift-multiplexing directions. For example, in the first shift-multiplexing directions the reference beams may be located between the holograms m and m+1, whereas in the second shift-multiplexing direction the reference beams are located between the holograms n and n+1, with n≠m. The latter solution is also useful if both shift-multiplexing directions use different shift-distances, as it allows to arrange the reference beams essentially symmetrical around the object beam or the reconstructed object beam.

Advantageously, the apparatus further has a Fourier filter for blocking the reference beams. When the reference beams are located between the hologram positions m/m+1, the diameter D of the Fourier filter preferentially satisfies the equation D=2×(m+0.5)×d, where d indicates the shift distance. The proposed relation between the shift distance and the Fourier filter diameter allows to obtain the optimal arrangement of the multiplexed holograms in a simple way. At the same time, the image quality parameters are further optimized.

Advantageously, a holographic storage medium is recorded with a writing method according to the invention, or is adapted to be read with a reading method according to the invention. This means that the holographic storage medium has shift-multiplexed holograms, where the shift-distance of the shift-multiplexed holograms is such that during writing or reading each of two or more reference beams is located essentially halfway between two adjacent central peaks of shift-multiplexed holograms in the Fourier plane. The holograms thus represent the interference pattern generated by the superposition of the object beam and the two or more reference beams that are arranged in the prescribed way.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
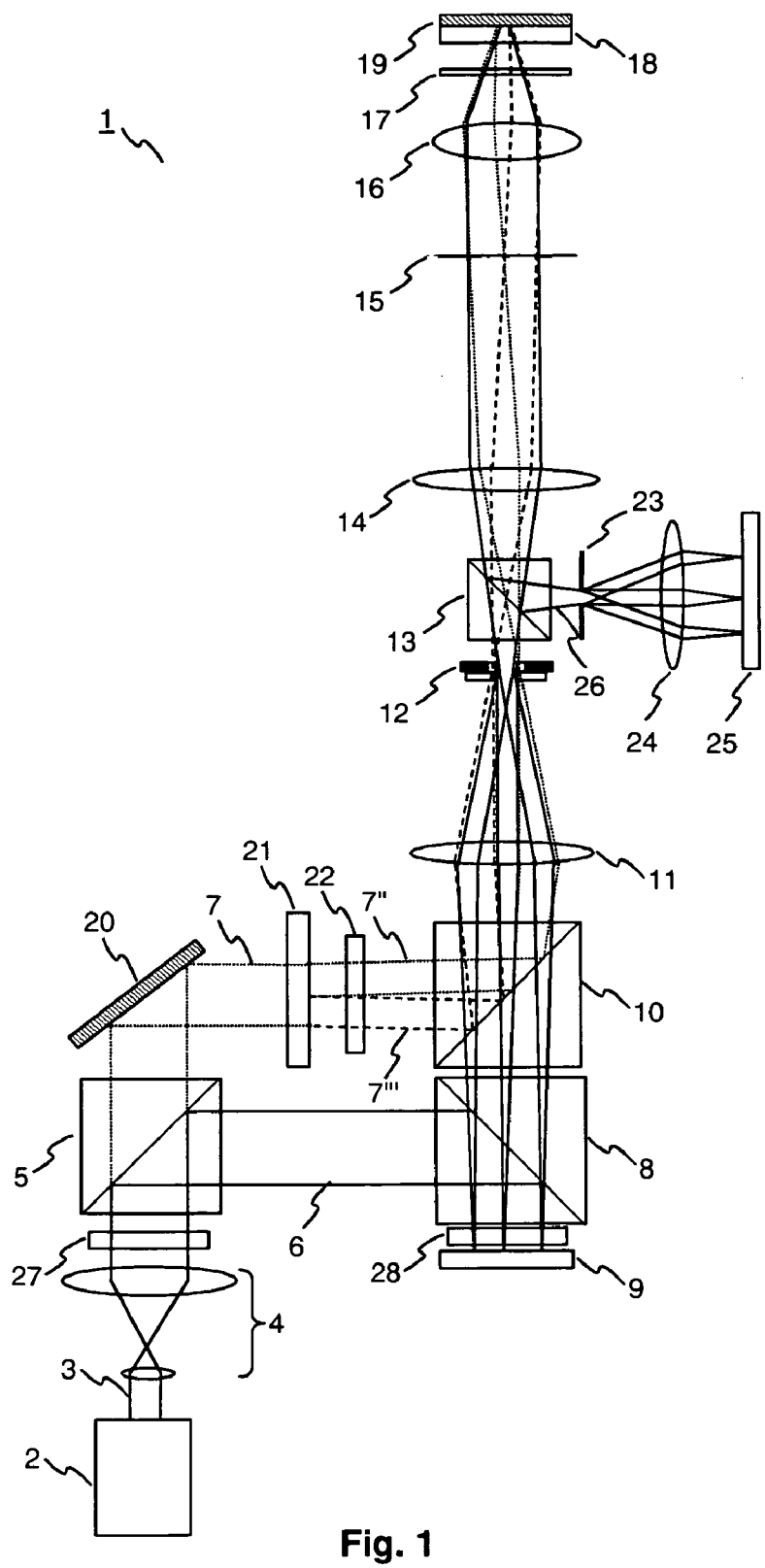
FIG. 1 illustrates a simplified setup of a common aperture reflection type holographic storage system.

A simplified setup of a common aperture reflection type holographic storage system 1 is illustrated in FIG. 1. For simplicity, an integrated servo system has been omitted in the figure. In the example the holographic storage system is a 12f system. A laser beam 3 emitted by a laser 2 is expanded by an optional beam expander 4 and divided into an object beam 6 and a reference beam 7 by a polarizing beam splitter (PBS) cube 5. A half wave plate 27 is located between the beam expander 4 and the PBS cube 5. The laser 2 emits a linearly polarized laser beam 3. By rotating the half wave plate 27 the polarization direction of the laser beam 3 can be rotated into an arbitrary direction. The PBS cube 5 divides the laser beam 3 into two orthogonal polarized (P and S polarized) laser beams 6, 7. The rotation of the half wave plate 27 allows to control the beam intensity ratio of the P and S polarized beams, or in other words the intensity ratio in the object arm and reference arm. For optimizing the readout diffraction efficiency it is desirable to optimize the intensity ratio during recording. The object beam 6 is directed onto a reflection type SLM 9 by a second PBS cube 8. After reflection from the SLM 9, the object beam 6 passes through the second PBS cube 8 and is combined with the reference beam 7 by a third PBS cube 10. Today's practically used SLMs are based on liquid crystal (LC) technology. These LC SLMs are pixelated, switchable quarter wave plates. In case the SLM 9 does not constitute a quarter wave plate by itself, an additional quarter wave plate (not shown) needs to be inserted between the SLM 9 and the second PBS cube 8. The reference beam 7 is directed towards the third PBS cube 10 by a mirror 20. In the optical path of the reference beam there are a half wave plate 22 and a beam generator 21, e.g. a diffraction type beam generator. The beam generator 21 generates multiple reference beams 7", 7'''. As indicated before, the object beam 6 and the reference beams 7", 7''' are coupled into the main coaxial arrangement by the third PBS cube 10. Following this PBS cube 10 there is a first long focal length objective 11. Long focal length in this case means that the focal length is long enough to place additional optical components between the lens and the focus without having too much aberrations. Long focal length objectives have the advantage that their fabrication is simple and requires less optical elements. In addition, the diameter of the Fourier plane of a long focal objective is large, which simplifies the fabrication of filters placed into the Fourier plane as the fabrication tolerances are reduced. This first objective 11 generates the Fourier transform of the SLM 9 at the back focal plane of the first objective 11, which is the Fourier plane of the SLM. The first objective 11 also focuses the multiple reference beams 7", 7''' into the Fourier plane. Located in this Fourier plane is an in-coupling filter. The in-coupling filter 12 is designed such that it low-pass filters the object beam 6 and rotates the polarization of the reference beams 7", 7"'. After passing the in-coupling filter 12 the object beam 6 and the reference beams 7", 7"' pass through a fourth PBS cube 13. A second long focal length objective 14 after the PBS cube 13 retransforms the SLM image onto an intermediate object plane 15. A high NA Fourier objective 16, e.g. with NA≧0.6, transforms the SLM image onto or close to a mirror layer 19 of a holographic storage medium 18. During writing the object beam 6 interferes within the holographic storage medium 18 with the direct reference beams 7", 7"' and the reference beams 7", 7"', reflected by the mirror layer 19. During reading a reconstructed object beam 26 is retransformed by the high NA Fourier objective 16 onto the intermediate image plane 15. A quarter wave plate 17 is located between the high NA Fourier objective 16 and the holographic storage medium 18. Of course, the quarter wave plate 17 can be located anywhere between the fourth PBS cube 13 and the holographic storage medium 18. As the beams pass through this quarter wave plate 17 twice, the polarization direction of the reconstructed object beam 26 is orthogonal to the polarization direction of the original object beam 6. The reconstructed object beam 26 is again Fourier transformed by the second long focal length objective 14. Due to the rotation of the polarization, the PBS cube 13 reflects the reconstructed object beam 26 onto an out-coupling filter 23, which is located in the third Fourier plane of the 12f system. The out-coupling filter 23 blocks the reference beams 7", 7"', thus only the reconstructed object beam 26 is imaged onto a detector array 25 by a third long focal length objective 24.

Though in the above polarizing beam splitters 5, 8, 10, 13 are used, it is likewise possible to use partially reflective beam splitters instead, or to use both types of beam splitters. In this case some of the half wave plates 22, 27 and quarter wave plates 17, 28 can be omitted.

In the following the so-called 'intrinsic noises' of the common aperture holographic storage system 1 are investigated, which are defined as the noises originating from the basic physics of the multiplexed holograms. These are the inter pixel and the inter hologram cross talk, and the diffraction noise caused by the filtering and non-perfect out-coupling of the reference beam. The common property of the intrinsic noises is that these are primary originated from the parameters of the optical layout and the grating structure multiplexed into the storage material. In the first approximation these intrinsic noises do not depend on the real technical parameters of the optical and servo system (e.g. optical aberration, servo misalignment, etc.) and the real characteristic of the storage material.

In Z. Karpati et al.: "*Comparison of Coaxial Holographic Storage Arrangements From the M Number Consumption Point of View*", Jap. J. Appl. Phys. Vol. 46 (2007), pp. 3845, it has been shown that the reference diffraction noise is not an important factor in the common aperture system. It is a few orders of magnitude smaller than the same type of noise in the split aperture systems. However, there is a further special intrinsic noise, which shall now be investigated in detail.

To examine the intrinsic noises a numerical model is used, which is an extended version of the Volume Integral Equation (VIE) method. The integrating volume is divided into plane slices, and the contribution of these slices to the entire scattered field is calculated by two-dimensional Fast Fourier Transform (2D FFT). This calculation method allows to consider the sub-holograms formed by parallel and counter propagating beams, the reconstructed direct and reflected object beams as well as forward and backward scattered light (noise).

Figure 2:
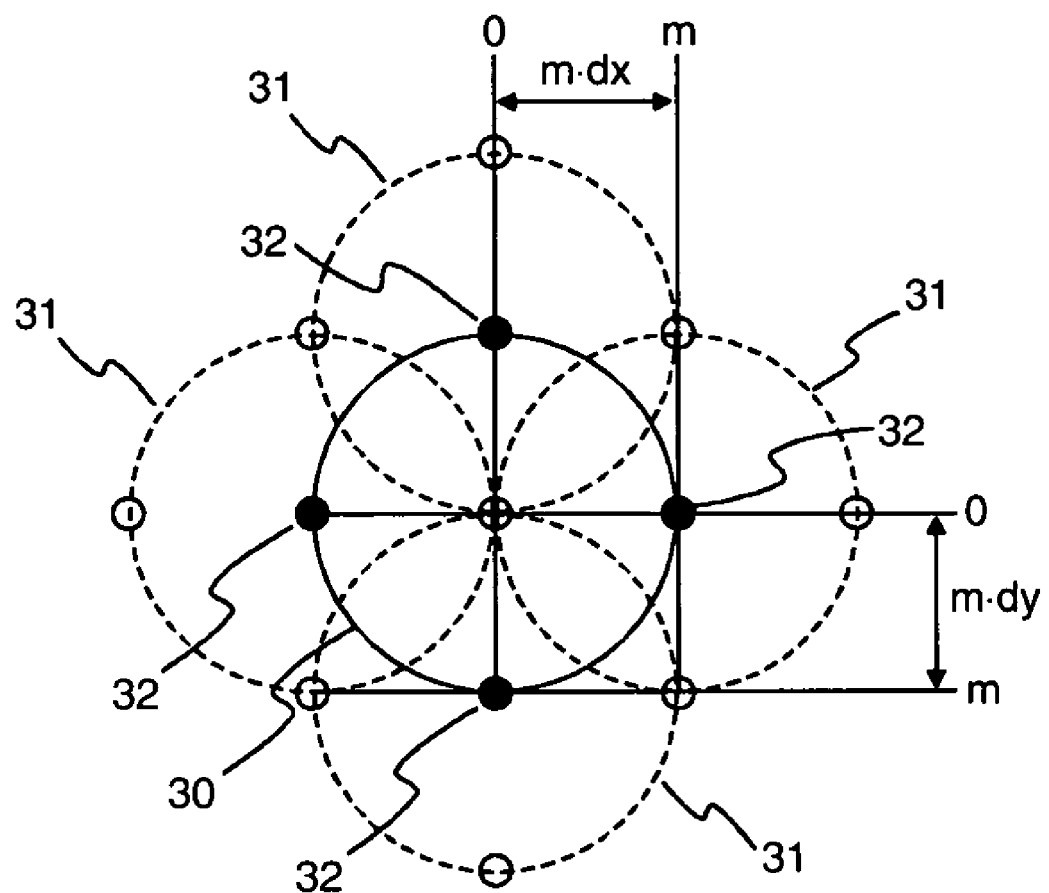
FIG. 2 shows a simplified view of the Fourier plane with an addressed hologram and four multiplexed holograms.

FIG. 2 shows a simplified view of the Fourier plane in or close to the mirror layer 19 of the holographic storage medium 18, with the addressed hologram 30 in the center and four multiplexed holograms 31, which are shifted by ±m×dx or ±m×dy relative to the addressed hologram 30. The terms dx and dy denote the shift distance in X and Y direction, respectively. The figure shows a critical case of the positions of the multiplexed holograms 31, where in each case one of the readout reference beams 7", 7"' coincides with one of the central peaks of the Fourier transform of the object beam of the multiplexed holograms 31 shifted by ±m×dx or ±m×dy. In other words, the tips 32 of the reference beams 7", 7"' coincide with the central peaks of the shifted holograms 31.

Figure 3:
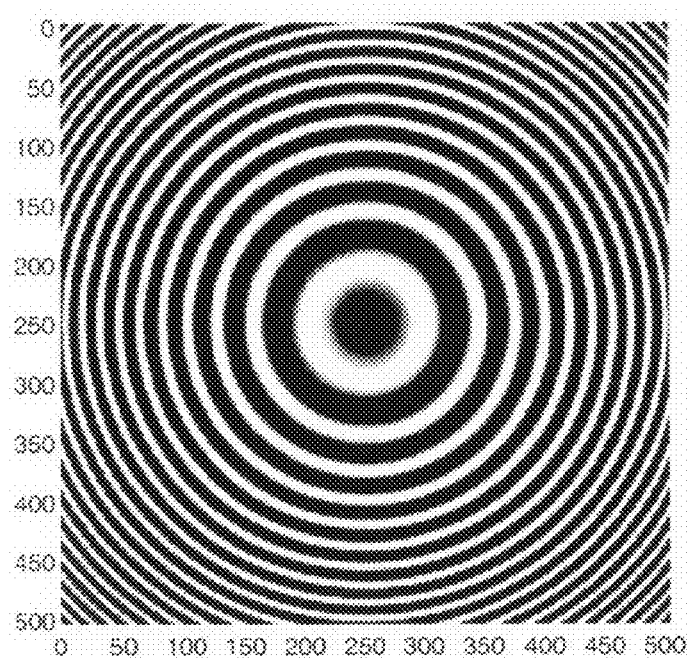
FIG. 3 shows the electric field distribution of a converging, full-cone shaped spherical reference beam at the top surface of the storage material.
Figure 4:
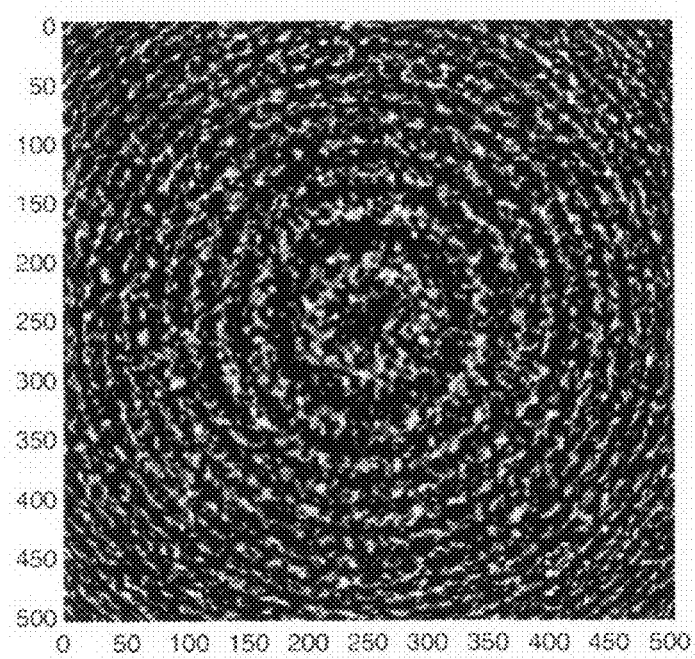
FIG. 4 shows the electric field distribution of a converging object beam at the top surface of the storage material.

For simplicity, first a transmission type arrangement is investigated, where the reference beams 7", 7"' are full cones. FIG. 3 shows the electric field distribution of a converging, full-cone shaped spherical reference beam 7", 7"' at the top of the storage material of the holographic storage medium 18. FIG. 4 shows the electric field distribution of a converging object beam 6, i.e. the imaged SLM 9, at the same position. It can be seen that these beams 6, 7", 7"' are essentially similar to each other. Because of this similarity, in the critical case of FIG. 2 the central peaks of the shifted holograms 31 can act as 'reference beams'. As a result the readout reference beams 7", 7' read out the reference beams of the shifted holograms 31, which in this case are the 'object beams', with a relatively high diffraction efficiency. In this critical case, in each case one of the readout reference beams of the shifted holograms 31 is in coincidence with the central peak of the Fourier transform of the addressed hologram 30. After retransforming these readout reference beams, a plane wave is obtained at the surface of the detector 25, which is coherently summed up with the reconstructed image of the SLM 9. Because of the x-y symmetry, there are four similar readout reference beams, which form four noise plane waves on the surface of the detector 25. More precisely, because the readout reference beams 7", 7"' are not completely similar to the Fourier transform of the SLM 9, the reconstructed reference beams are not exact plane waves. Thus the four plane-like reconstructed reference beams form an intensity modulation on the surface of the detector 25.

Qualitatively, the situation is similar in case of a reflection type arrangement. However, in the reflection type arrangement there are direct and reflected object beams and reference beams, and these beams form different sub-holograms. The reference beams 7", 7"' are generally half cone shaped beams, but the central peak of the Fourier transform of the SLM 9 results from the combination of the direct and the reflected half cone shaped beams, i.e. from "full-cone shaped" beams. Thus during the reconstruction the reference beams of the shifted holograms 31 are also reconstructed in a phase conjugated manner. The reconstructed reference beams are half-cone shaped, and the tips of the reconstructed reference beams are essentially in coincidence with the central peak of the addressed hologram 30 at the Fourier plane. This is reasonably correct for the direct, the reflected and the phase conjugated case. After the reconstructed direct, reflected and phase conjugated reference beams are retransformed by the Fourier objective 16, they form plane-like beams on the surface of the detector 25. These reconstructed plane-like beams are added up coherently to the SLM image. Though it is difficult to illustrate all beams in a drawing, in the numerical model all the direct, reflected and also the phase conjugate beams originating from all the sub-holograms can be considered.

Figure 5:
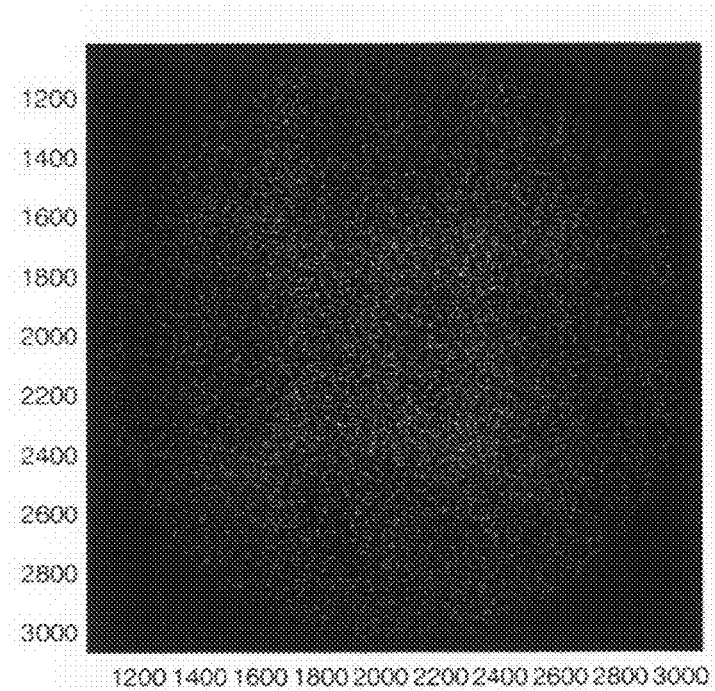
FIG. 5 depicts a simulated reconstructed SLM image of the multiplexed holograms in case of a critical arrangement.
Figure 6:
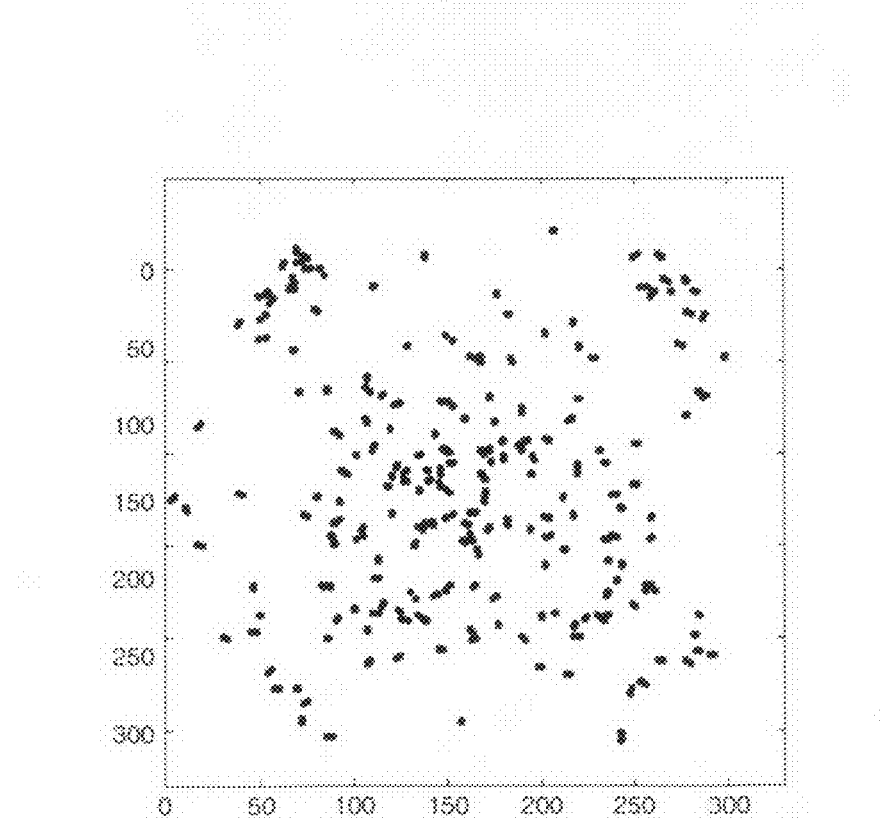
FIG. 6 shows the bit error map resulting from the reconstructed SLM image of FIG. 5.

FIG. 5 shows a simulated reconstructed SLM image of the multiplexed holograms for a reflection type holographic storage medium, which contains the noise beams caused by the reconstruction of the reference beams. FIG. 6 shows the corresponding bit error map. In this example the multiplexed holograms are in the critical arrangement. A 15×15 multiplexing is used, the shift distances are dx=dy=22.22 µm. The diameter of the applied Fourier filter is 177.8 µm. The tips 32 of the reference beam cones are in coincidence with the central peak of the 4th holograms. The resulting signal to noise ration is SNR=1.61, the symbol error rate is SER=3.89× 10−2, the bit error rate is BER=4.89×10−3.

If the coincidence between the readout reference beams 7", 7''' and the central peaks 33 of the shifted holograms 31 is not total, the diffraction efficiency of the reconstructed reference beams is reduced. In addition, their position is a little bit shifted from the central peak of the addressed hologram 30, which means that the noise caused by these reconstructed shifted reference beams is less.

Figure 7:
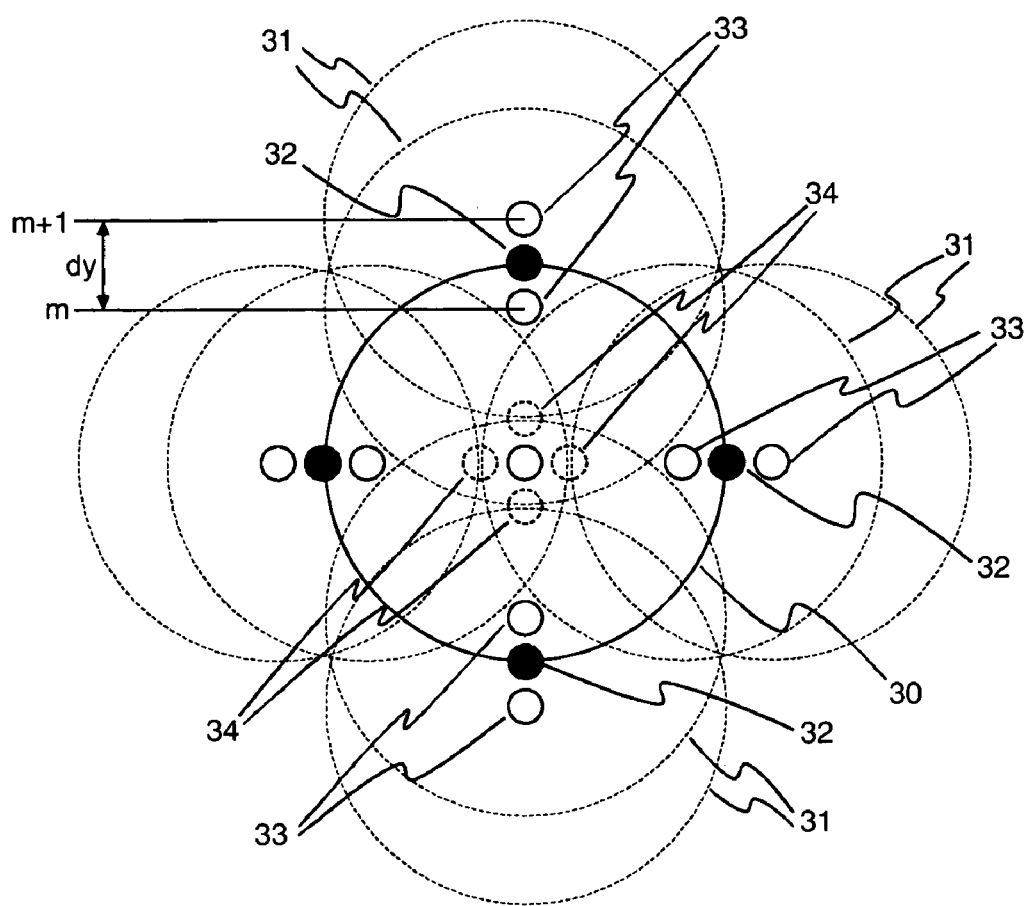
FIG. 7 shows an optimal arrangement of the multiplexed holograms and the reference beams in the Fourier plane.

It has been found that the optimal arrangement of the multiplexed holograms 31 and the reference beams 7", 7''' is when the tips 32 of the reference beams 7", 7''' are located halfway between two adjacent shifted object peaks 33 (the central peaks 33 of the Fourier transform of the shifted object beams, i.e. the centers of the multiplexed holograms 31) at the Fourier plane. This optimal arrangement is illustrated in a simplified manner in FIG. 7. In the figure some reference signs have been omitted for better clarity. In addition, only the distance dy between two holograms multiplexed in y-direction is labeled. The arrangement is optimal for a transmission type arrangement as well as for a reflection type arrangement. The figure shows eight shifted holograms 31 in similar positions. The central peaks 33 of these eight shifted holograms 31 are in each case at a distance of half the shift distance from one of the reference beams 7", 7'''.

In the case of a transmission type arrangement the four readout reference beams 7", 7''' reconstruct eight reference beams 34 at four different positions. These eight reconstructed reference beams 34 are located at +/−half the shift distance from the center of the addressed hologram 30 in X- and Y-direction, respectively. After retransforming the reconstructed reference beams 34 slightly tilted plane-like waves are obtained at the surface of the detector 25. These plane waves are coherently added to the reconstructed SLM image. The plane-like beams form a special intensity modulation on the surface of the detector 25.

In case of a reflection type arrangement, there are direct, reflected and phase conjugated reconstructed half-cone shaped reference beams 34 near the center of the addressed hologram 30 at the Fourier plane. By retransforming these half-cone shaped direct, reflected and phase conjugated reference beams 34 with the Fourier objective 16 an aggregate of tilted plane-like beams is obtained at the surface of the detector 25. These interfering plane-like beams lead to a special intensity modulation on the image of the reconstructed SLM.

Figure 8:
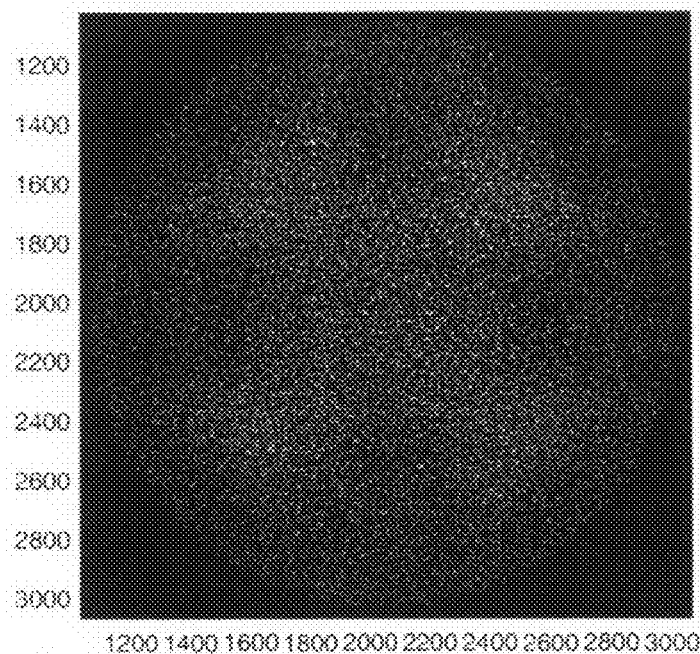
FIG. 8 depicts a simulated reconstructed SLM image of the multiplexed holograms in case of the optimal arrangement.
Figure 9:
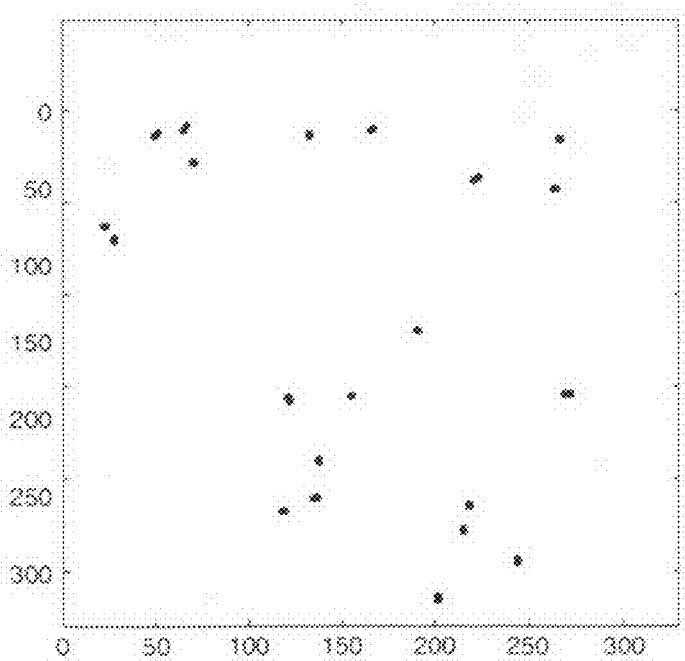
FIG. 9 shows the bit error map resulting from the reconstructed SLM image of FIG. 8.

As indicated above, the shift distance is optimal when the readout reference beams 7", 7''' are located at half the shift distance between two central peaks 33 of the shifted holograms 31, i.e. at the midpoint of two adjacent shifted object peaks 33. To achieve this, for a further simulation the shift distance was set to dx=dy=19.75 µm. FIG. 8 shows the resulting reconstructed SLM image when the shifted holograms 31 are in the optimal position, FIG. 9 the corresponding bit error map. As can be seen, the reconstructed plane-like beams modulate the SLM image on the surface of the detector 25, but the image quality is better and the overall noise level is reduced.

The results of the numerical simulations are summarized in the following Table 1. From the table it is apparent that with the optimal arrangement of the multiplexed holograms the intrinsic noise of the common aperture holographic arrangement is greatly reduced.

TABLE 1

Image quality parameters of the reconstructed holograms in the presence of multiplexing

| Multiplexing parameters | SNR | BER | SER |
| --- | --- | --- | --- |
| Holograms at critical position, dx = dy = 22.22 µm, 15 × 15 multiplexing | 1.61 | $4.89 \times 10^{-3}$ | $3.89 \times 10^{-2}$ |
| Holograms at optimal position, dx = dy = 19.75 µm, 25 × 25 multiplexing | 1.98 | $4.97 \times 10^{-4}$ | $3.97 \times 10^{-3}$ |

Because the noise peaks are close to the center of the addressed hologram 30, and because the distance between them is approximately equal to the shift distance, it is difficult to filter out these noise peaks from the reconstructed Fourier transform of the SLM. It is also problematic to eliminate this type of noise at the image plane. After retransforming the peaks a plane-like wave is obtained at the image plane, which essentially covers the whole surface of the detector 25. For reducing the effect of the noise a sharper image is useful. If the image of the reconstructed SLM has more contrast, and more energy, than the coherently added plane-like noise beams cause less bit error, i.e. less error bits. For increasing the sharpness and energy of the reconstructed SLM image of the addressed hologram 30, a larger diameter Fourier filter 23 is used. In the following Table 2 the results of the numerical calculations with multiplexing are summarized. In these simulations the diameter of the Fourier filter 23 and the number of pixels of the single holograms were varied. The multiplexed holograms were arranged in optimal position, i.e. the tips 32 of the reference beam cones are situated on the midpoints of two adjacent multiplexed holograms. On the other hand the tips are arranged equally around the Fourier filter 23. This means that there is a well-determined relation between the shift distance dx=dy=d and the diameter D of the Fourier filter 23. In the Table, the tips 32 of the reference beam cones are arranged between the hologram positions m/m+1, with m=4, 5, . . . , 10, respectively. With other words, the diameter D of the Fourier filter 23 has to satisfy the equation D=2×(m+ 0.5)×d, i.e. the diameter D of the Fourier filter equals the sum of the distances of the hologram position m and the hologram position m+1 from the position of the addressed hologram.

TABLE 2

Comparing image parameters and capacities for Fourier filters with different diameter. The shift distances were calculated in such a way that the tips of the reference beam cones are situated on the midpoints of two adjacent multiplexed holograms.

| Row# | Filter diameter D (µm) | Image quality | Shift distance (µm) | Tip is between holograms and m + 1 | Raw capacity (Gbyte/disk) |
| --- | --- | --- | --- | --- | --- |
| 1 | 177.8 | SNR = 1.56 SER = 0.0721 BER = 0.00913 | 19.75 | 4/5 | 635 |
| 2 | 220 | SNR = 1.78 SER = 0.0273 BER = 0.0034 | 20 | 5/6 | 620 |
| 3 | 260 | SNR = 2.16 SER = 0.0015 BER = 0.000189 | 20 | 6/7 | 620 |

TABLE 2-continued

Comparing image parameters and capacities for Fourier filters with different diameter. The shift distances were calculated in such a way that the tips of the reference beam cones are situated on the midpoints of two adjacent multiplexed holograms.

| Row# | Filter diameter D (µm) | Image quality | Shift distance (µm) | Tip is between holograms and m + 1 | Raw capacity (Gbyte/disk) |
|---|---|---|---|---|---|
| 4 | 260 | SNR = 1.71<br>SER = 0.0789<br>BER = 0.01 | 17.33 | 7/8 | 824 |
| 5 | 289 | SNR = 2.04<br>SER = 0.0138<br>BER = 0.0017 | 17 | 8/9 | 857 |
| 6 | 329.7 | SNR = 1.93<br>SER = 0.0327<br>BER = 0.0042 | 15.7 | 10/11 | 1004 |

The results of Table 2 show that the image parameters are greatly improved by increasing the diameter D of the Fourier filter 23. For example, from rows 1 to 3 the symbol error rate and the bit error rate are reduced more than one order of magnitude, while the filter diameter D is only increased by about 50%. Similarly, comparing rows 4 and 5, the symbol error rate and the bit error rate are reduced to about ⅕, while the filter diameter is only increased by about 10%.

What is claimed:

1. A common aperture type apparatus for reading an addressed hologram from a holographic storage medium, which comprises shift-multiplexed holograms, with a coaxial arrangement of four reference beams and a reconstructed object beam, the four reference beams being arranged crosswise around the reconstructed object beam in a storage layer of the holographic storage medium, wherein each of the four reference beams is located essentially halfway between two central peaks of shift-multiplexed holograms in a Fourier plane of the apparatus.

2. The apparatus according to claim 1, wherein each of the four reference beams is located essentially at half a shift distance between two adjacent central peaks of shift-multiplexed holograms.

3. The apparatus according to claim 1, further having a Fourier filter for blocking the four reference beams.

4. The apparatus according to claim 3, wherein each of the four reference beams of the addressed hologram as located between hologram positions m/m+1, and wherein a diameter D of the Fourier filter equals a sum of distances of the hologram position m and the hologram position m+1 from the position of the addressed hologram.

5. A method for writing a hologram to a holographic storage medium using shift-multiplexing with a coaxial arrangement of four reference beams and an object beam, having a step of arranging the four reference beams crosswise around the object beam in a Fourier plane located in or at a storage layer of the holographic storage medium in such way that each of the four reference beams is located essentially halfway between two adjacent central peaks of shift-multiplexed holograms.

6. A method for reading an addressed hologram from a holographic storage medium, which comprises shift-multiplexed holograms, with a coaxial arrangement of four reference beams and a reconstructed object beam, having a step of arranging the four reference beams crosswise around the reconstructed object beam in a Fourier plane located in or at a storage layer of the holographic storage medium in such way that each of the four reference beams is located essentially halfway between two adjacent central peaks of shift-multiplexed holograms.

7. A holographic storage medium having shift-multiplexed holograms, wherein the holograms represent an interference pattern generated by a superposition of an object beam and four reference beams arranged crosswise around the object beam, the four reference beams being chosen such that each of the four reference beams is located essentially halfway between two adjacent central peaks of shift-multiplexed holograms in a Fourier plane located in or at a storage layer of the holographic storage medium.

8. A common aperture type apparatus for writing a hologram to a holographic storage medium using shift-multiplexing, with a coaxial arrangement of four reference beams and an object beam, the four reference beams being arranged crosswise around the object beam in a storage layer of the holographic storage medium, wherein each of the four reference beams is located essentially halfway between two central peaks of shift-multiplexed holograms in a Fourier plane of the apparatus.

9. The apparatus according to claim 8, wherein each of the four reference beams is located essentially at half a shift distance between two adjacent central peaks of shift-multiplexed holograms.

* * * * *